United States Patent [19]

Katsuzawa et al.

[11] Patent Number: 5,084,642
[45] Date of Patent: Jan. 28, 1992

[54] CHANNEL STRUCTURE FOR COOLANT IN MOTOR

[75] Inventors: Yukio Katsuzawa; Michi Masuya; Yasuyuki Nakazawa, all of Yamanashi, Japan

[73] Assignee: Fanuc, Ltd., Yamanashi, Japan

[21] Appl. No.: 474,031

[22] PCT Filed: Aug. 16, 1989

[86] PCT No.: PCT/JP89/00832

§ 371 Date: Apr. 18, 1990

§ 102(e) Date: Apr. 18, 1990

[30] Foreign Application Priority Data

Aug. 19, 1988 [JP] Japan .................. 63-204711

[51] Int. Cl.$^5$ .................................. H02K 9/193
[52] U.S. Cl. .................................. 310/54; 310/52; 310/58; 310/59
[58] Field of Search ............. 310/52, 54, 58, 59, 310/61

[56] References Cited

U.S. PATENT DOCUMENTS 4,534,686  8/1985  Nakamura et al. ............. 310/59
4,691,131  9/1987  Nakano ........................... 310/54
4,700,092 10/1987  Bincoletto ....................... 310/54

FOREIGN PATENT DOCUMENTS 60121941  5/1983  Japan ............................... 310/54

Primary Examiner—Steven L. Stephan
Assistant Examiner—Matthew Nguyen
Attorney, Agent, or Firm—Armstrong, Nikaido, Marmelstein, Kubovcik & Murray

[57] ABSTRACT

When an operation of a motor cannot be continued due to a large amount of heat generated when the motor is rotated at a high speed and under a high load, the motor is usually cooled by adopting a cooling structure using a coolant with a high cooling performance. It is, however, difficult to cast a casing with a complex channel, and the manufacturing costs are high. According to the present invention, through channels (15a, 15a) are formed along a central casing (10) of a motor casing consisting of a main central casing (10), a front end casing and a rear end casing (12, 14) when casting, and each through channel (15a, 15b) is communicated via communication holes (16a, 16b, 18a, 18b) drilled in the front end casing (12) and in the rear end casing (14), so that the whole of the casing can be fully cooled.

1 Claim, 2 Drawing Sheets

CHANNEL STRUCTURE FOR COOLANT IN MOTOR

TECHNICAL FIELD

The present invention relates to a channel structure for a coolant in a motor, and is especially appropriate for cooling a small motor with a high power output and a high revolutional speed by a coolant.

BACKGROUND ART

A motor cooled by a coolant can generate about 1.5 to 2 times as much power as a motor cooled by air, although the two motors have the same size, since the coolant has a high cooling ability. Furthermore, the coolant-motor can reduce an increase of a temperature of each part of the motor, due to a heat generated by a continuous high load, a core loss during a high revolutional speed, frictional loss of a bearing, and so on. Moreover, a channel for a coolant must be formed in a motor, and accordingly, in the prior art, a channel is formed when a casing of a motor is cast, and then a portion to be covered is covered by a plate member.

Generally, a motor is attached to a machine by the front end of the casing thereof, and accordingly, a coolant must be supplied from the rear of the motor, returned to the rear again, and after this cycle is repeated several times, the coolant must be returned to a tank from the rear. Therefore, a communicational channel must be formed when casting the casing so that those longitudinal channels are communicated with one another, and accordingly, the casting of the casing is very difficult when producing a casing with such a defect.

DISCLOSURE OF THE INVENTION

Accordingly, an object of the present invention is to provide a channel structure for a coolant in which the casting of a casing is easy and the cost of the casting is low.

In view of the above-mentioned object, the present invention provides a channel structure for a coolant in a motor, a casing of which is constructed by arranging a front end casing, a central casing, and a rear end casing along a longitudinal direction, characterized in that a plurality of pairs of channels are formed along the longitudinal direction through the central casing so that each pair is substantially equidistant in a circumferential direction of the central casing, an outer contour of the front end casing being a substantially polygonal column, a channel hole having a circular section being formed along the longitudinal direction at corners of the front end casing corresponding to each channel of the central casing, and another channel hole having a circular section being formed perpendicularly to an outer face of the front end casing to be communicated with the channel hole, the another channel hole being communicated with another channel hole at each of the corners.

The casting of the central casing is easy since channels for a coolant are formed in the central casing only along a longitudinal direction thereof. It is easy to provide a hole having a circular section to the front end casing at a position corresponding to a through channel formed in the central casing along the same longitudinal direction as the through channel by drilling, and to drill perpendicularly to an outer face of the front end casing of a substantially polygonal column so that a lateral hole communicated with the above-mentioned longitudinal drilled hole can be easily drilled, and both lateral drilled holes provided to adjacent outer side faces are communicated with each other. One through channel called a going channel, of each pair of through channels provided to the central casing, is communicated with one longitudinal drilled hole communicated with one lateral drilled hole communicated with the other lateral drilled hole, and therefore, is communicated with the other longitudinal drilled hole communicated with the other through channel, called a return channel, provided to the central casing. Namely, the above-mentioned going channel and return channel are communicated with each other via the drilled holes provided at a corner portion of the front end casing. The front end casing must be cooled, since a motor is generally attached to an applied machine by the front end casing. The front end casing can be sufficiently cooled since the above-mentioned drilled holes for communication are provided at a plurality of corners of the front end casing.

BEST MODE OF CARRYING OUT THE INVENTION

Figure 4:
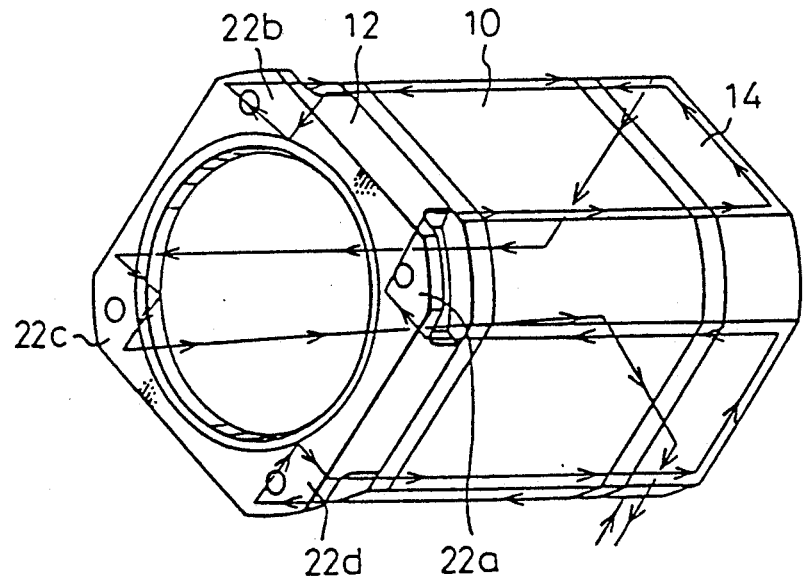
FIG. 4 is a perspective view showing channels of casings of a motor according to the present invention.

The present invention will be described in detail hereinafter according to the embodiment shown in the attached drawings. A motor is provided with a casing divided into three parts, each being arranged along a longitudinal direction, that is, a central axis direction of the motor, as shown in FIG. 4. The three parts constructing the casing having a substantial rectangular column contour are a long central casing 10 in the middle position thereof, a front end casing 12 at the front position, and a rear end casing 14 at the rear position. The front end casing is made from cast iron, and the central and rear end casings are made from aluminum cast alloy.

Figure 3:
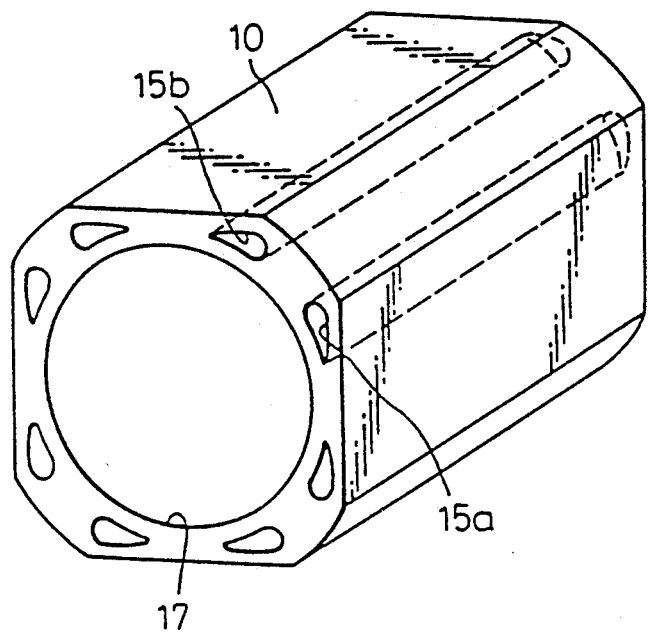
FIG. 3 is a perspective view of a central casing of a motor.

FIG. 3 shows a perspective view of a central casing 10 having a substantially rectangular column contour. A pair of through holes 15a and 15b for a flow of a coolant are formed t each corner portion of the central casing along the longitudinal direction, when casting, wherein one through hole 15a is a going channel for a coolant flowing toward the front end casing 12, and the other 15b is a return channel for the coolant flowing back toward the rear end casing 14. It is easy to cast the through holes 15a, 15b and a central hole 17 to house a stator and a rotor therein, as they are all formed along one direction.

Figure 1:
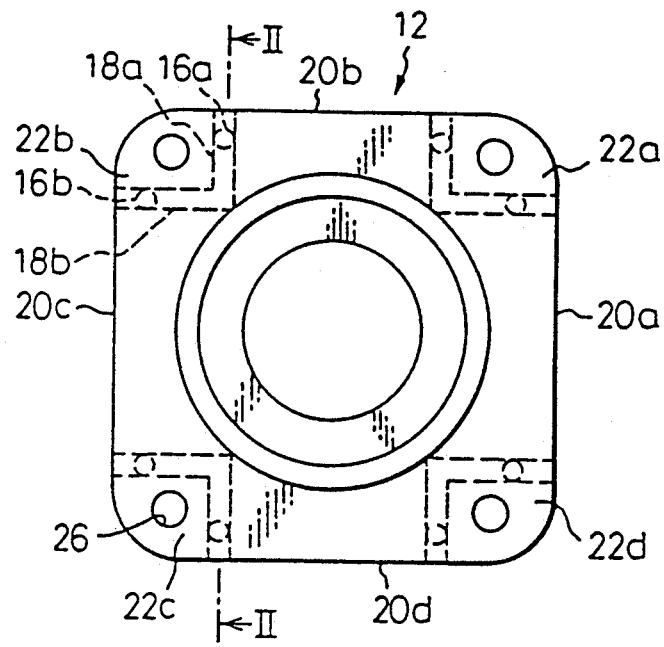
FIG. 1 is a front view of a front end casing of a motor.
Figure 2:
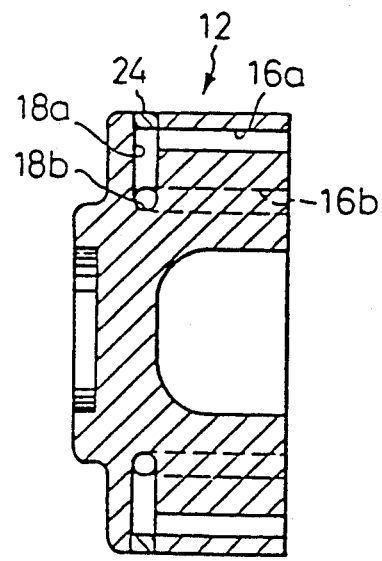
FIG. 2 is a sectional view taken along the line II—II in FIG. 1.

Now, referring to FIGS. 1 and 2, communicational channels are formed as mentioned below, which communicate the above-mentioned going channel 15a with the return channel 15b at four corner portions 22a, 22b, 22c, and 22d of the front end casing 12, and which cool the front end casing 12. Longitudinal holes 16a and 16b are formed by drilling to a predetermined depth at respective positions corresponding to the going channel 15a or the return channel 15b of the central casing 10. The longitudinal hole 16a communicates with a lateral hole 18a formed perpendicularly to an outer face 20b of the front end casing 12 by drilling, on the other hand, the longitudinal hole 16b communicates with the other lateral hole 18b formed perpendicularly to an outer face 20c by drilling. The two lateral holes 18a and 18b communicate orthogonally. The lateral holes 18a and 18b are plugged by usual members 24 at openings thereof formed at faces 20b, 20c, so that a coolant flows from the going channel 15a, to the longitudinal hole 16a, to the lateral hole 18a, to the lateral hole 18b, to the longitudinal hole 16b, and to the return channel 15b. Longitudinal holes along the longitudinal direction of the casing and lateral holes orthogonal to the longitudinal holes are formed on the rear end casing 14 by drilling, as shown by a streamline in FIG. 4, these holes communicate the going channel with the return channel adjacent to the going channel in the central casing 10, and thus all of the pairs of through channels 15a, 15b can be communicated. Accordingly, a coolant can flow along the arrowed path shown in FIG. 4, having one inlet and one outlet, so that each portion of the casing can be cooled. Note, obviously the arrowed flow path is provided to avoid the holes 26 shown in FIG. 1, to which bolts are inserted.

It will be apparent from the foregoing description that, according to the present invention, all of the flow channel holes to be formed by casting are through holes in only a longitudinal direction, and thus the casting is easy, and the flow channel holes are easily formed in the front end casing perpendicularly to each face thereof by drilling, so that a coolant can flow and cool the front end casing. Accordingly, there can be provided a casing in which flow channels are easily formed and having a low cost.

We claim:

1. A channel structure for a coolant in a motor casing for housing a stator and a rotor therein which is constructed by arranging a front end casing, a central casing, and a rear end casing along a longitudinal direction, wherein the improvement comprises: a plurality of pairs of channels formed along the longitudinal direction through said central casing so that each pair is substantially equidistant in a circumferential direction of said central casing, an outer contour of said front end casing being a substantially polygonal column, first channel holes having a circular section being formed along the longitudinal direction at corners of said front end casing and corresponding to each channel of said central casing, second channel holes having a circular section being formed perpendicularly to an outer face of said front end casing with each second channel hole communicating with a first channel hole and with another second channel hole at each of said corners, and a plurality of holes provided in said rear end casing which communicate one channel of each pair of channels in said central casing with a channel of an adjacent pair of channels in said central casing.

* * * * *